Feb. 9, 1932. A. J. LAYHON 1,844,288
AUTOMOBILE SHOCK ABSORBER
Filed Jan. 6, 1930
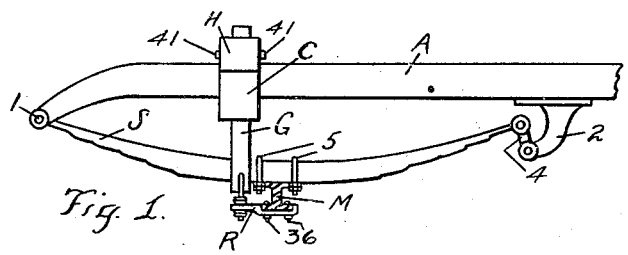
Fig. 1.
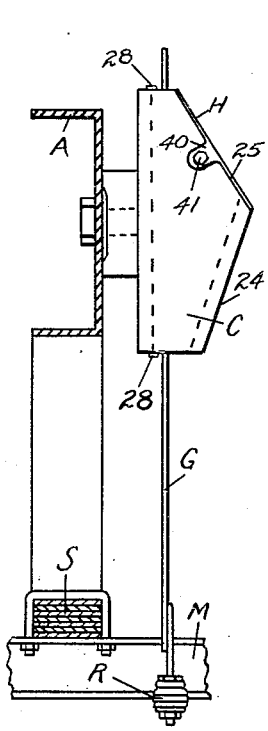
Fig. 2.
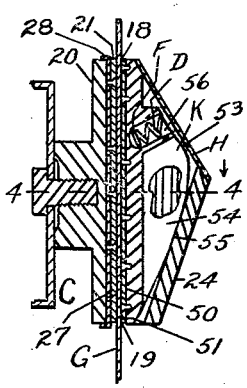
Fig. 3.
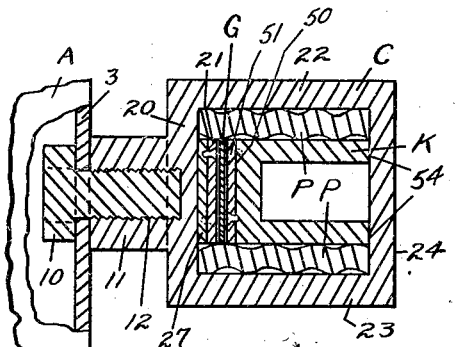
Fig. 4.
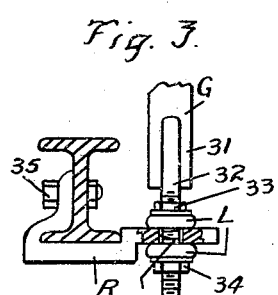
Fig. 5.
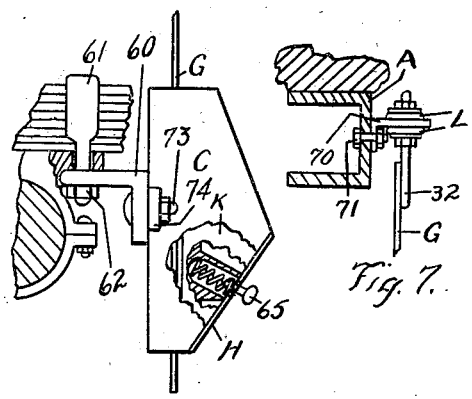
Fig. 6.
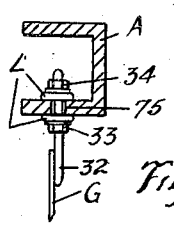
Fig. 7.
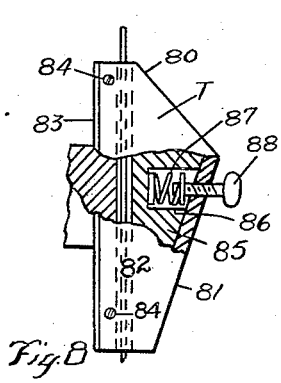
Fig. 8.
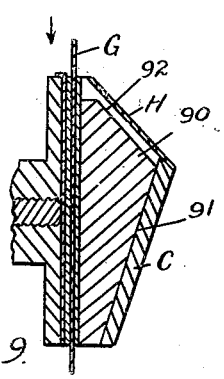
Fig. 9.
Fig. 10.
INVENTOR
Arthur J. Layhon
BY Gardner W. Pearson
ATTORNEY Patented Feb. 9, 1932

1,844,288

UNITED STATES PATENT OFFICE

ARTHUR J. LAYHON, OF LOWELL, MASSACHUSETTS, ASSIGNOR OF ONE-HALF TO REUBEN DUNSFORD, OF CHELMSFORD, MASSACHUSETTS

AUTOMOBILE SHOCK ABSORBER

Application filed January 6, 1930. Serial No. 418,774.

This invention relates to shock absorbers for automobiles, particularly to what might be called the wedge type.

The purpose of a shock absorber generally is to provide some means whereby when either in going over a rise or when going into or coming out of a depression, the wheels and axle move toward the body, they can do so gently and slowly thus compressing the springs, and when the spring rebounds and throws the body or the chassis away from the axle, the throwing tendency will be delayed or slowed down and made more gentle.

It is particularly desirable that this reaction or throwing should be checked at the beginning and this device is especially adapted for quick braking action on the rebound.

I am aware that there are patents of the type shown by Reno, No. 1,263,469, April 23, 1918 in which there may be either one or two long narrow wedges which operate by gravity and friction for the purpose of allowing the above action and this present invention is an improvement thereon.

Where a long slim wedge is used and gravity is depended upon, it does not always act, it does not act quickly enough, and there is a tendency for the wedge to bind between the connecting strap and the casing and to freeze or lock in place.

With this device, I am enabled to use a more stocky or thicker wedge, preferably with rounded or convex bearing surfaces which do not readily bind and by the use of a spring and adjusting devices I cause such a wedge to act as quickly and as firmly as desired.

In addition to this, I prefer to provide additional cushioning means which take up part of the shock.

My shock absorber is noiseless, and does not chatter nor shiver. It can be arranged to cause more friction on one movement than the other. It is easily adjustable and is reversible.

My device is also of the double action type or, in other words, it retards both the up and down movement of the automobile body and not merely one of said movements.

In the drawings, Fig. 1 is a side elevation showing the device connecting the body or a part of the body of an automobile with an axle.

Fig. 2 is an enlarged elevation as from the left of Fig. 1 parts being shown in section.

Fig. 3 is an elevation similar to part of Fig. 2 showing the shock absorber casing and other parts in section.

Fig. 4 is a horizontal section shown as enlarged and as on line 4—4 of Fig. 3.

Fig. 5 is an enlarged elevation partly in section showing some of the details of the device shown in Fig. 1.

Fig. 6 is an elevation similar to Fig. 2 showing a modified construction.

Fig. 7 is an elevation showing another part of the construction shown in Fig. 6.

Fig. 8 is an elevation of another modification part being shown in section.

Fig. 9 is a sectional elevation of another modification.

Fig. 10 shows another means of attaching the strap shank to a side bar.

In the drawings, A represents one of the side bars of the chassis or body of an automobile shown as being supported by a common type of leaf spring S pivoted at one end 1 to bar A, and, at the other end, by means of a shackle 4 pivoted to a bracket 2 fastened to bar A.

M is an axle, which ordinarily would be at the front, attached to spring S by means of U-bolts 5.

As shown in Fig. 1, the pivot bracket R may be attached to an axle M by means of bolts 36, or as shown in Fig. 5 by means of bolt 35.

Through each of these pivot brackets is a shank hole 37 through which loosely passes the round, threaded shank 32 at one end of the flat, metal, connecting strap G.

As shown I prefer to use the two retaining collars 33 and 34, shown as being adjustable nuts screwed on shank 32, and, between these, the two elastic buffers shown as rubber collars L, L, which engage each side of pivot bracket R which is rigidly attached to any part of the body or axle.

The shock absorber includes the above parts and a casing C which has a flat back 20 to which by any suitable means is attached brake lining material 21 and which has at the top and bottom the passages 18 and 19 through which passes the connecting strap G.

22 and 23 represent the sides of the casing and 24 is a part of the front which is closed and extends at an acute angle with the back 20.

As shown, lining 21 is riveted to a metal strip 27, the ends 28, 28, of which are bent over to clasp back 20 at the top and bottom. This provides for quick replacement.

The other part of the front indicated by 25 is open and the adjoining front edges of the sides 22 and 23 extend at a different angle with the back 20 whereby the removable cover H when in place extends, preferably, at a different angle with the back than the front closed part 24.

As shown, cover H has on each side the ears 40—40 through which are holes for screws such as 41 whereby the cover can be put in place or removed.

K represents a wedging member which extends loosely between the back 20 and the closed front 24 and also the open part 25 of the front. Said wedging member where it adjoins the back 20 or the brake lining 21 and the connecting strap G, is at 50 flat and preferably lined with brake material 51, while at its front 54 where it engages closed front 24, it is convex, so that only a small part of it 55 can at any time touch the inside of lower front 24. This convex facing prevents wedge K from jamming or freezing in one place.

At the other part 53 of its front, wedge K may slant at any desired angle, but preferably one different from that at 54 and preferably so that it may engage the cover H.

As shown in Figs. 2 and 3, I provide extending diagonally into the upper part of wedging member K, a spring hole 56.

In this hole, I locate a compression spring D and I prefer to use in connection therewith a pressure adjusting member shown as a disc F which may be thicker or thinner as desired, in order to increase or decrease the pressure of spring D between disc F and cover H.

Spring D is preferably of less diameter than hole 56 to allow free movement to wedge K.

Preferably the curved point of contact 55 of wedge K with front 24 is two-thirds down from spring hole 56.

The connecting strap G is of flat spring metal preferably of less width than the interior width of casing C, so as to allow for lateral movement, and this carries at one end the shank 32 while at the other end, it extends up through casing C between it and wedge K.

In the construction shown in Figs. 2 and 3, the tendency of gravity is to cause the wedge to engage strap G and this is increased by the action of the spring D. For the up stroke, if desired, the angle of hole 56 and the tension of spring D can be altered so as to get the desired amount of pressure. Such pressure depends upon the relationship of the wedging surfaces, the angle of pressure and the strength of spring D.

On the inside of each side 22 and 23 of casing C, I prefer to locate linings P, P of suitable corrugated material such as paper, leather-board or leather and I may soak these in oil or other similar material so that the wedging member K can move readily in the casing and also so that the strap G can move from side to side and still normally keep about in the center.

Projecting from the back of casing C I show a hub or fastening member 11 through which and into the casing C is a threaded hole 12 for an attaching screw 10. This screw may be loose allowing a pivotal action of the casing, but I prefer to have it rigid depending upon the loose coupling between shank 32 and pivot bracket R and the fact that the inside width of casing C is greater than the width of strap G thus allowing for any rocking motion, while by making the strap G of spring metal, any rocking in the other direction is taken up thereby.

As shown in Figs. 6 and 7 instead of attaching the casing to the body or a side bar of frame A, I can invert it, using a bracket or angle iron 60 having holes through which the spring bolts 61 pass, the nuts such as 62 holding it in place. Screws such as 73 pass through the other arm or bracket 60 and ears such as 74 on casing C thereby fastening casing C upside down.

A thumb screw 65 replaces disc F for adjusting spring D.

Shank 32 extends upward through another bracket 70 shown in Fig. 7 as attached to side bar A by a bolt 71. If the location of the parts permits, I may, as shown in Fig. 10, pass shank 32 through a hole 75 through the bottom member of a side bar A.

As shown in Fig. 8, I can use a modified type of casing T which at the front 80 and 81 and the sides 82 is solid, the back 83 being fastened to the sides by screws 84—84. The long slope at the front 81 is similar to 24 but it is not open at the front and has no cover, the other part 80 of the front, being closed and at a different angle from 81 with the back.

In this construction, I show a wedging member 85 in which at right angles to the back is a spring hole 86 of considerably larger diameter than the compression spring 87. The spring adjusting member is shown as a thumb screw 88.

In some cases as shown in Fig. 9, I may find it desirable to use with a casing C and strap G, similar to those shown in Figs. 1, 2 and 7, a wedging member 90 which at the front is cut on two different slants at 91 and 92 there being no spring of any kind. On account of the difference in the slant at 91 and 92, the friction on strap G will be much greater when it is being pulled in the direction of the arrow than in the opposite direction.

In all my construction there is a double action. In other words, there is a friction on both up and down movements and the friction in each case is different.

I claim:

1. The combination in a shock absorber; of a casing having a flat back to the inside of which is attached brake lining material, sides, and a front, one part of which extends at an acute angle with the back and another part of which extends at a different acute angle with the back; a double ended wedging member which loosely fits between the back and front and which has a spring hole in its front; a compression spring positioned in the spring hole; a pivot bracket adapted to be fixed to an automobile and which has a shank hole; a connecting strap of flat metal of less width than the inside of the casing and which extends between the back of the casing and the wedging member, said strap at one end terminating in a shank which loosely passes through the shank hole in the pivot bracket; and means to retain said shank in the shank hole.

2. The combination in a shock absorber; of a casing having a flat back to the inside of which is attached brake lining material, sides, and a front, one part of which extends at an acute angle with the back and another part of which extends at a different acute angle with the back; a double ended wedging member which loosely fits between the back and front; a pivot bracket adapted to be fixed to an automobile and which has a shank hole; a connecting strap of flat metal which extends between the back of the casing and the wedging member, said strap at one end terminating in a shank which loosely passes through the shank hole in the pivot bracket; and means to retain said shank in the shank hole.

3. The combination in a shock absorber; of a casing having a flat back to the inside of which is attached brake lining material, sides, and a front, one part of which extends at an acute angle with the back and another part of which extends at a different acute angle with the back; a double ended wedging member which loosely fits between the back and front; a connecting strap of flat metal which extends between the back of the casing and the wedging member; and means to attach one end of said strap to an automobile.

ARTHUR J. LAYHON.